(12) United States Patent
Shtop et al.

(10) Patent No.: US 10,673,628 B1
(45) Date of Patent: Jun. 2, 2020

(54) AUTHENTICATION AND AUTHORIZATION TOKEN MANAGEMENT USING LIFE KEY SERVICE

(71) Applicant: EMC IP Holding Company LLC, Hopkinton, MA (US)

(72) Inventors: Aliaksandr Shtop, Oakville (CA); Ilia Fischer, Milton (CA); Michael Roche, Hamilton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 175 days.

(21) Appl. No.: 15/499,232

(22) Filed: Apr. 27, 2017

(51) Int. Cl.
| | |
|---|---|
| *H04L 9/08* | (2006.01) |
| *H04L 29/06* | (2006.01) |
| *H04L 9/32* | (2006.01) |
| *G06F 21/31* | (2013.01) |

(52) U.S. Cl.
CPC ............ *H04L 9/0891* (2013.01); *G06F 21/31* (2013.01); *H04L 9/0894* (2013.01); *H04L 9/32* (2013.01); *H04L 9/3213* (2013.01); *H04L 63/08* (2013.01); *H04L 63/10* (2013.01); *H04L 2209/24* (2013.01)

(58) Field of Classification Search
CPC ... H04L 9/0866; H04L 9/3066; H04L 9/3231; H04L 9/3297; H04L 12/40; H04L 9/0891; H04L 9/0894; H04L 63/08; H04L 63/10; H04L 2209/24; H04L 9/32; H04L 9/3213; G06F 21/31
See application file for complete search history.

(56) References Cited

U.S. PATENT DOCUMENTS

| | | | | |
|---|---|---|---|---|
| 6,233,565 | B1 * | 5/2001 | Lewis ................... | G06Q 20/00 705/26.1 |
| 7,206,936 | B2 * | 4/2007 | Aull ...................... | G06Q 20/341 713/173 |
| 9,608,813 | B1 * | 3/2017 | Roth ..................... | H04L 9/0894 |
| 2007/0053510 | A1 * | 3/2007 | Rosati .................... | H04L 51/12 380/30 |
| 2008/0319909 | A1 * | 12/2008 | Perkins .................. | G06Q 10/00 705/50 |
| 2012/0041881 | A1 * | 2/2012 | Basu ..................... | G06Q 20/02 705/67 |

(Continued)

OTHER PUBLICATIONS

SAML version 2.0 Specification available at http://saml.xml.org/saml-specifications, 2005, sections 2.3.4, 2.4, 5, 2.2, 2.5.1.*

(Continued)

*Primary Examiner* — Alexander Lagor
*Assistant Examiner* — Howard H. Louie
(74) *Attorney, Agent, or Firm* — Staniford Tomita LLP

(57) ABSTRACT

Embodiments are directed to a method and system for managing token keys in an authentication and authorization process for a multi-tenant computer network by receiving a user request from a user through a user agent for data access to network clients, generating a key to encrypt and sign a data string to encapsulate a token, passing the token as part of the request to the network clients to receive a response from a client to the user request, notifying, in the event of a key state change, user agents of the key state change asynchronously to other events, and generating a refreshed key for subsequent user requests to encapsulate subsequent tokens for the user.

16 Claims, 7 Drawing Sheets

(56) References Cited

U.S. PATENT DOCUMENTS

| | | | | |
|---|---|---|---|---|
| 2013/0042115 | A1* | 2/2013 | Sweet | H04L 63/0428 |
| | | | | 713/176 |
| 2014/0283010 | A1* | 9/2014 | Rutkowski | G06F 21/31 |
| | | | | 726/18 |
| 2014/0325599 | A1* | 10/2014 | Everhart | H04L 63/104 |
| | | | | 726/4 |
| 2014/0351910 | A1* | 11/2014 | Tenenboym | H04L 63/0823 |
| | | | | 726/7 |
| 2015/0059003 | A1* | 2/2015 | Bouse | G06F 21/31 |
| | | | | 726/28 |
| 2017/0034133 | A1* | 2/2017 | Korondi | H04L 63/0815 |
| 2017/0195119 | A1* | 7/2017 | Roth | H04L 9/0894 |
| 2018/0075231 | A1* | 3/2018 | Subramanian | G06F 21/41 |

OTHER PUBLICATIONS

CompTIA Security+: Study Guide, by Emmett Dulaney, Fourth Edition, Sybex, Nov. 2008, section 7.7.*

System for Cross-domain Identity Management, From Wikipedia, Jun. 1, 2016 Version, available at https://en.wikipedia.org/w/index.php?title=System_for_Cross-domain_Identity_Management&oldid=723166778.*

* cited by examiner

AUTHENTICATION AND AUTHORIZATION TOKEN MANAGEMENT USING LIFE KEY SERVICE

TECHNICAL FIELD

Embodiments are generally directed to multi-tenant networks, and specifically to an authentication and authorization token management using life key management.

BACKGROUND

In multi-tenant network environments, a single instance of an application runs on a server and serves multiple tenants. A tenant is a group of users who share a common access with specific privileges to the application. Multi-tenant systems provide every tenant a dedicated share of the software instance, including its data, configuration, user management, tenant-specific functionality, and other properties. Multitenancy is an important feature of cloud computing. Cloud computing networks that provide shared computer processing resources (e.g., network links, servers, storage, applications, etc.) and data to computers and other devices on demand. Cloud computing and storage solutions provide users and enterprises with various capabilities to store and process their data in either privately owned, or third-party data centers. Cloud networks often use virtual data centers (vDCs) comprising large numbers of virtual machines (VMs) that use server virtualization products to store virtual machine disk images.

With large-scale environments in which many tenants share common resources stored in often virtual storage locations, it is absolutely vital to maintain data integrity and strict controlled access among the tenants to their own data and services. An authentication and authorization (AA) service is a multi-tenant component used to authenticate and authorize principals' access to data of various software components designated to serve multiple tenants. It enables logical separation between tenants' data within a single software component. This is key in a multi-tenant architecture in which a single instance of a software application serves multiple tenants to ensure that no tenant has unauthorized access to another tenant's data.

In more complex cases, however, some degree of access flexibility may be required. For example, in the case of a service provider deployment, one tenant may need to have some kind of access to the serviced organizations' tenants for billing, reporting or administration needs. In other cases, the internal structure of organization may require logical separation between its departments' data, which can be defined as internal tenants by themselves. For example, many organizations may want to mutually isolate R&D (research and development) and HR (human resources) departments' access to their own respective data, however, both of these departments may be administered by the IT (information technology) department, which has certain access to their data. The AA Service uses the concept of "roles" and "tenants" to encapsulate these data access privileges through role based access control (RBAC). In general, RBAC is a policy-neutral access control mechanism that is defined around roles and privileges of personnel or departments within a company or organization. RBAC uses role permissions and user/role relationships to assign and enforce network access privileges within the organization.

A software component that serves multiple tenants and needs to enforce the RBAC protocols needs to obtain the principals' roles in a secure manner. In certain systems, tokens are used to securely pass the principal's details between different components. To achieve strong security standards, the principal details are encapsulated into a package of information and encrypted with certain key which belongs to the target component/tenant to guarantee that only an authorized component/tenant may decrypt and access principal details. A token may have several packages encrypted with different keys.

In a multi-tenant environment, the encryption system is a powerful tool that enables efficient data protection and separation. To manage encryption keys, tenant organizations establish key management systems. Each organization (or tenant) may implement a different key management system. The same key management system may be shared between the organizations and each organization may implement different key policies. Authentication and authorization tokens represent sensitive tenant information and need to meet tenant specific key management policies. Current approaches to key management are based on manual workflows, which is not efficient and subject to errors. What is needed, therefore, is an efficient and automated workflow process to manage tokens in a multi-tenant environment with life key management mechanisms.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
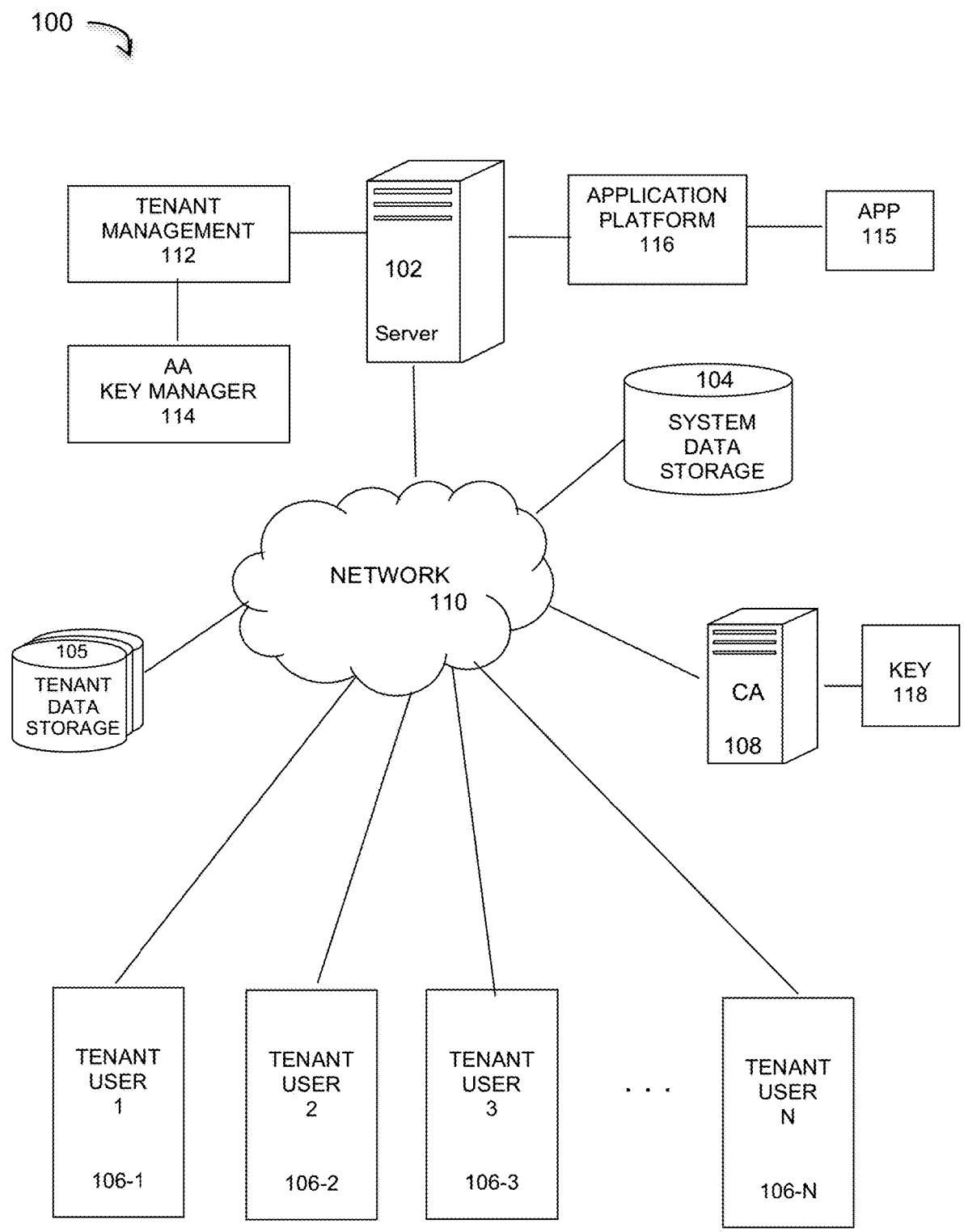
FIG. 1 illustrates a multi-tenant network system that implements some embodiments of an efficient and automated framework to perform authentication and authorization token management using a life key management scheme.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve RBAC-based authentication and authorization token management in multi-tenant networks based a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a multi-tenant network system 100 that implements one or more embodiments of an efficient and automated framework to perform authentication and authorization token management using a life key management scheme. System 100 represents a network environment in which on-demand applications hosted by a server 102 through an application platform 116 may be used by a number N of tenants 106-1 to 106-N. In an embodiment, system 100 may implement virtualization technology in the multi-tenant network in which the server 102 runs a single instance of an application program that is designed to virtually partition its data so that each client works with its own customized virtual application, with each virtual machine (VM) representing virtual clients that may be supported by one or more servers within each VM, or other type of centralized network server.

A typical example application 115 is a shared database in which each tenant 106 is a database user and has access to various parts of the data within the database. In this case server 102 is a database server that simultaneously processes requests for the N tenant users in response to queries or other access requests by the users. Such data storage may be any appropriate networked accessed storage devices 114. The data sourced by the data source may be any appropriate data, such as database data that is part of a database management system. In this case, the data may reside on one or more hard drives (or similar storage devices) and may be stored in the database in a variety of formats (e.g., XML or RDMS). The database server may instantiate a program that interacts with the database. Each instance of a database server may, among other features, independently query the database and store information in the database, or it may be an application server that provides user interfaces to database servers, such as through web-based interface applications or through virtual database server or a virtual directory server applications. Embodiments, however, are not so limited and any appropriate application or applications 115 may be hosted by server 102 and managed through application platform 116.

In the multi-tenant environment 100, the application 115 is an on-demand application in which the application data and/or its processes is made available to the users when the users need the application, and that is provided in a manner that does not require each user to build or maintain their own local version of the application. The application platform 116 enables the creation, management, and execution of applications developed by the server 102 administrator or other developers. The server may utilize system data storage 104, while the tenant users may have respective tenant data storage 105.

The network server computer 102 is coupled directly or indirectly to the tenants any network clients and other servers through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP) as in hypertext transport protocols (HTTP), well known in the relevant arts. In a distributed network environment, network 110 may represent a cloud-based network environment in which applications, servers and data are maintained and provided through a centralized cloud computing platform.

Any number N of real or virtual machines may be used to implement the tenant platforms 106-1 to 106-N. Though referred to generally as "users," such machines may represent individual user operated machines, automated processes, hardware devices, and so on. The tenant users may have different capacities, roles, capabilities and privileges with respect to the data, applications, and other resources of network 100. These privileges may be determined by permissions, policies, or rules defined within the system. Thus, for the example of FIG. 1, tenant management system 112 includes policies that implement privileges and accesses for each of the tenants with respect to the applications and system data. In an embodiment in which network 100 represents a single or unitary organization network, server 102 may represent the system administrator server, while tenant management module 112 would contain personnel management processes or the like.

In an embodiment, tenant management module 112 includes an RBAC-based authentication and authorization (AA) service that governs the network access of the tenant users based on the roles of each tenant user. In this context, access is the ability of an individual user to perform a specific task, such as view, create, or modify a file, or access their own (and other) partitions within the tenant and/or system data. Roles are generally defined according to job competency, authority, and responsibility within the enterprise or network. The AA service thus uses the concept of roles and tenants to encapsulate data access privileges within system 100. The RBAC process needs to obtain the users' roles in a secure manner in order to properly enforce the access rules. In an embodiment, tokens are used to securely pass user information and details among the processing components of the system.

In general, token-based authentication is stateless in that the system does not store any information about a user on the server or in a session. Implementation of a token use typically involves the following example process: (1) a user requests access with credentials (e.g., username and password); (2) the application validates the credentials; (3) the application provides a signed token to the client; (4) the client stores that token and sends it along with every request; and (5) the server verifies token and responds with data. In this process, tokens are stored on the client side and every single request requires a token, which are sent in the HTTP header.

In an embodiment, the tokens are Security Assertions Markup Language (SAML) that are XML representations of claims. In general, SAML tokens carry statements that are sets of claims made by one entity about another entity. For example, in federated security scenarios, the statements are made by a security token service about a user in the system. The security token service signs the SAML token to indicate the veracity of the statements contained in the token. In addition, the SAML token is associated with cryptographic key material that the user of the SAML token proves knowledge of. This proof satisfies the relying party that the SAML token was, in fact, issued to that user. For example, in a typical scenario: a client requests a SAML, token from a security token service, authenticating to that security token service by using Windows credentials; the security token service issues a SAML token to the client. The SAML token is signed with a certificate associated with the security token service and contains a proof key encrypted for the target service the client also receives a copy of the proof key. The client then presents the SAML token to the application service (the relying party) and signs the message with that proof key. The signature over the SAML token tells the relying party that the security token service issued the token. The message signature created with the proof key tells the relying party that the token was issued to the client.

Figure 2A:
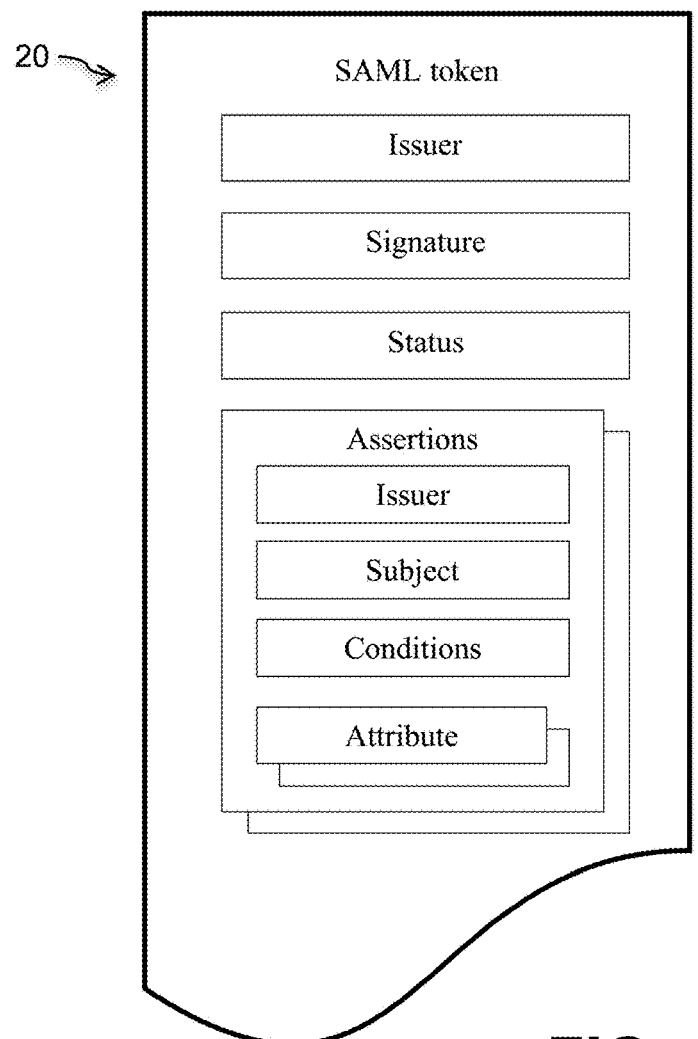
FIG. 2A shows an example SAML token structure, as used in some embodiments.

With regard to the token structure, a SAML token is a container for various elements. FIG. 2A shows an example SAML token structure, as used in some embodiments. As shown in FIG. 2, SAML token 20 includes fields to specify the identity of the issuer, the issuer's signature, and a status. The SAML token may also contain one or more SAML Assertions. The Assertions contains statements that a relying party should interpret as follows:
Assertion A was issued at time T by issuer R regarding subject S provided conditions C are valid.

The following XML snip presents an example SAML assertion structure:
<Assertion>
   <Issuer> . . . </Issuer>
   <Signature> . . . </Signature>
   <Subject> . . . </Subject>
   <Conditions> . . . </Conditions>
   <AttributeStatement>
      <Attribute> . . . </Attribute>
      . . .
      <Attribute> . . . </Attribute>
   </AttributeStatement>
</Assertion>

Figure 2B:
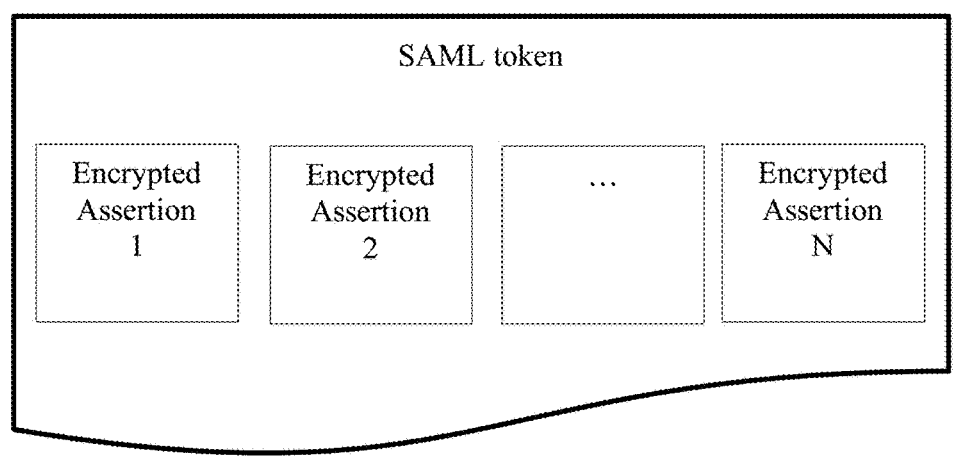
FIG. 2B illustrates a SAML token with encrypted assertions, where each assertion is encrypted with a separate key.

In a multi-tenant environment, a principal may have an access to different tenants. Upon successful authentication with an authentication and authorization server (AAS) or similar validating entity, a principal receives a SAML token. This token can be passed to different software components serving the same or different tenants. Software components may need to extract some principal details from the token. However, an un-authorized access must be prohibited. To achieve this, the principal details are encapsulated into a package of information which is stored as an Assertion in the SAML token. The SAML token can have multiple assertions. Each assertion is encrypted with certain key which belongs to the target component/tenant to guarantee that only authorized component/tenant may decrypt and access principal details. FIG. 2B illustrates a SAML token with encrypted assertions, where each assertion is encrypted with a separate key. For this illustration, SAML token 21 includes N Assertions denoted Encrypted Assertion 1 to Encrypted Assertion N.

Although embodiments are described with respect to the use of a SAML token, embodiments are not so limited and are generally independent of token type. In general, SAML (e.g., SAML v2 or SAML2) provides a good level of flexibility and is widely understood at present. SAML tokens are relatively large in terms of size and verbosity as they are based on XML syntax, so in alternative embodiments a light weight token, such as a JWT (JSON Web Token) or similar token may be used.

In an embodiment, system 100 includes an authentication and authorization (AA) key manager 114 that efficiently manages AA tokens in multi-tenant environment using life key management. The AA function may be performed by the AAS server or some other key management server. For purposes of the current description, the term "key" is used to reference key pairs and their associated certificates. Keys have a defined key life cycle. Typically, a key request is made to a Certificate Authority (CA) 108, which is responsible for verifying the requester's identity and generating a key for them using key process 118. The key is then valid for use by the users until its expiration date, at which point the key is automatically revoked. The private portion of the key is typically stored in a secure location, possible including a specialized hardware. If a key is lost, a system may allow key retrieval via a process known as key recovery. Typical key management system may support key revocation, which permanently invalidates the key. A key also could be temporary disabled through key suspension.

It should be noted that in federated security scenarios the data/sections of the token need to be protected from unauthorized access. Certain key mechanisms may be used provide such protection. Depending on implementation details, many keys may exist in the system, such as keys for validity/authenticity, client proof keys, encryption keys, and others. In a multi-tenant network, the tenant specific data are encrypted with tenant keys. The term "life key management" may be used for all kind of keys, and is not limited to any particular type of key or workflow. The term "token data encryption" references one type of key that may be used in the system.

Figure 3:
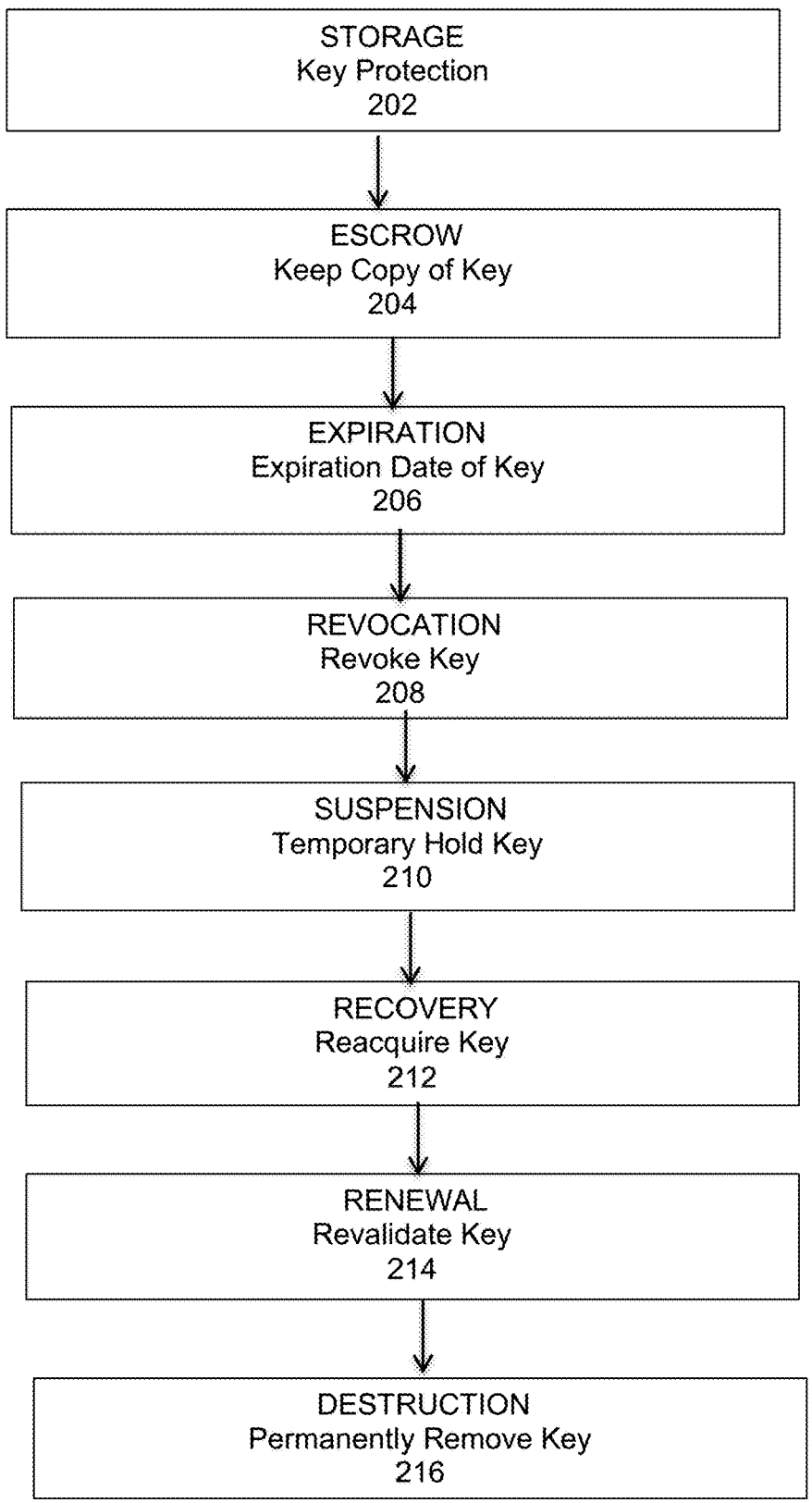
FIG. 3 is a flowchart that illustrates an example life-cycle in key management under some embodiments.

FIG. 3 is a flowchart that illustrates an example life-cycle in key management under some embodiments. As shown in FIG. 3, typical key management may have eight life cycles stages. These include storage 202, in which the key is protected through secure storage in a known location; escrow 204, which is a defined procedure to keep a copy of the key; expiration 206 which sets the key expiration date; revocation 208 which defines the key revocation procedure; suspension 210 which defines a procedure to put a temporary hold on the validity of the key; recovery 212 which defines a procedure to reacquiring the key after suspension; renewal 214 which defines a procedure to revalidate a key that has neared or passed its expiration date; and destruction 216 which is the permanent removal of a key.

In multi-tenant environment, such as system 100, the key management system may be implemented in different ways. Key management life cycles can be triggered manually or automatically, and in present systems, manual operations are usually required. For example, to move a key to a suspension state, the security administrator needs to perform some manual steps. In another example, the electronic key management system moves a key to a suspension state when a subscriber has not paid their annual service fee. Existing authorization and token management workflows also require manual user intervention to address state changes in the key management system. This could involve a user with a security administrator role to update the AA service and/or a regular user who is assuming special privileges. In either case, such manual procedure presents a time and user interaction burden, as a user may be required re-enter his or her credentials or restart operations which run across several tenants. Overall, such manual procedures are also a significant source of potential user error.

Figure 4:
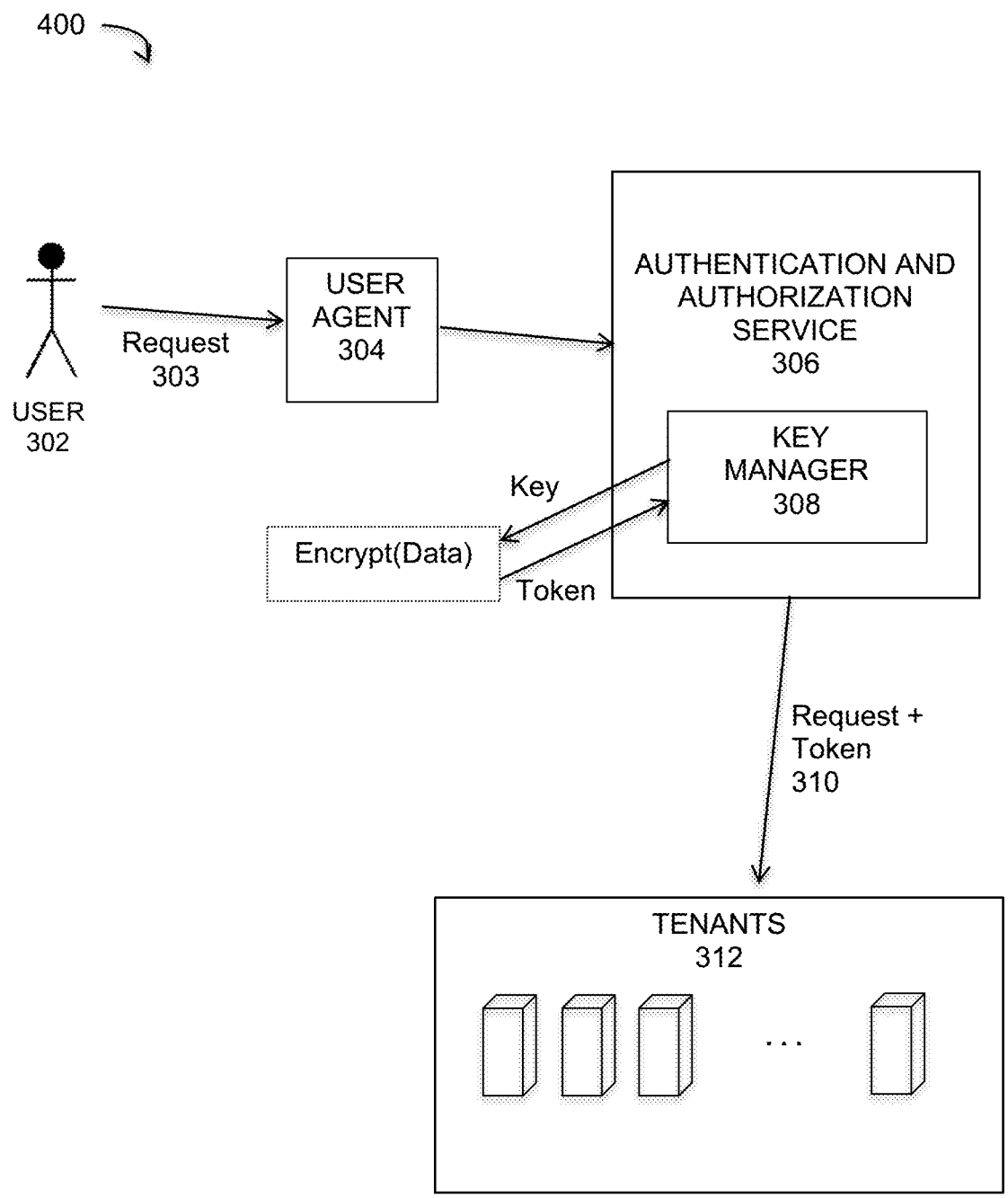
FIG. 4 illustrates a key management system for an authentication and authorization service under some embodiments.

In an embodiment, a key management solution provides a way to handle at least the expiration, revocation, suspension, renewal and destruction key states in an automated manner using processing components such as user agents and key managers as part of an AA service. FIG. 4 illustrates a key management system for an authentication and authorization service under some embodiments. Elements of system 400 may embody one or more processing components of elements 112 and 114 of FIG. 1. As shown in FIG. 4, an AA service 306 handles data access requests 303 made by a user 302 through a user agent process 304. The user agent could represent an independent software component, a library which could be integrated with a third party solution, or by a web browser or similar process or component. A key manager 308 generates and manages keys that are used to sign and encrypt data strings to produce corresponding tokens (e.g., SAML tokens). The request and token are then passed as a request 310 to the one or more tenants 312. In a typical usage scenario, the initiating user 302 may be one of the tenants 312. FIG. 4 generally represents an initial token processing stage that is followed by certain like key management stages, such as key change events, as described in further detail below.

In an embodiment, a user agent 304 requests services from tenants. During the course of life key management, any particular key may change its status at any time, i.e., asynchronously to any other processing in the system. For example, the key could be replaced or expired or moved to any other state as shown in FIG. 3.

Figure 5:
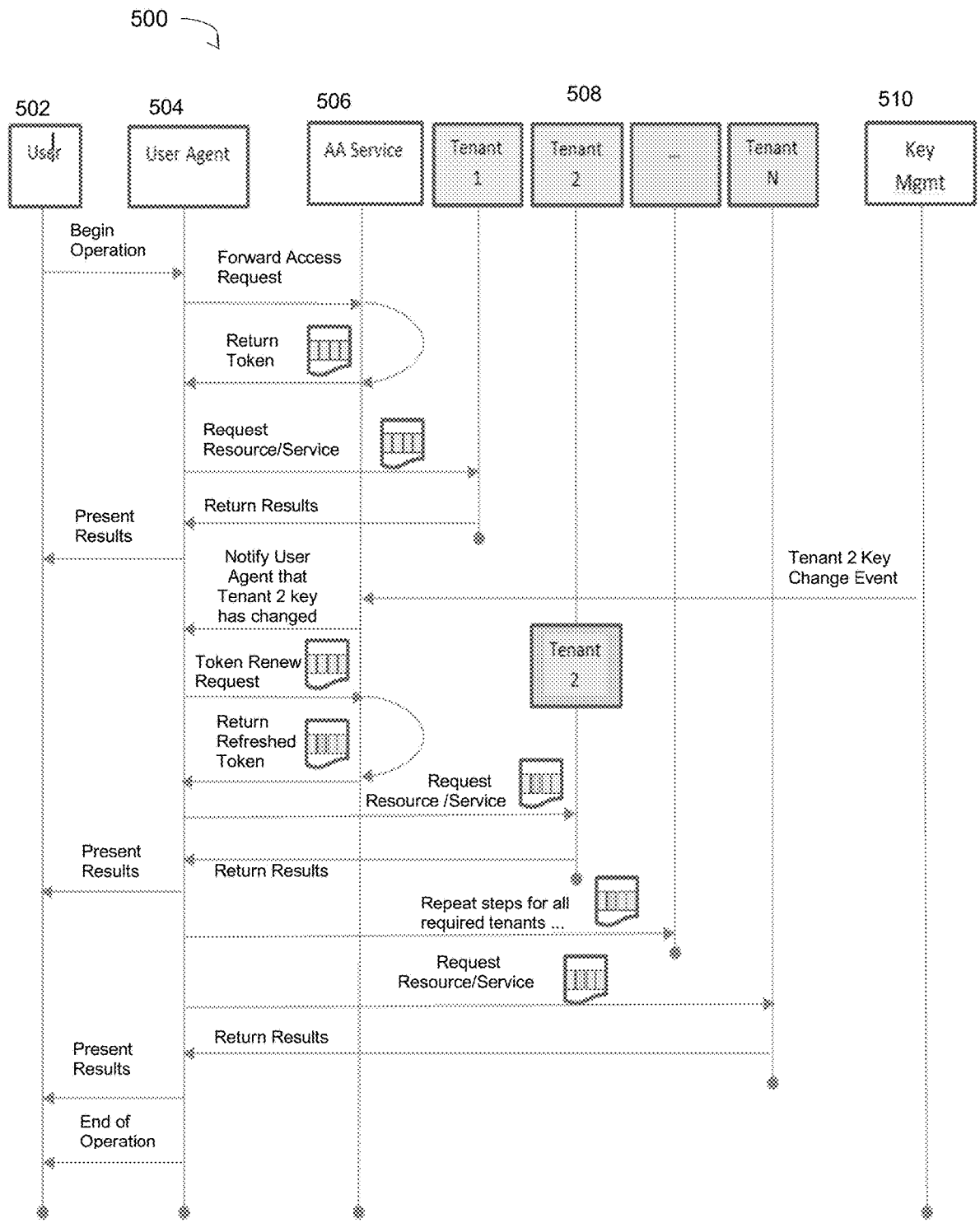
FIG. 5 illustrates a key management flow diagram using the system of FIG. 4 under some embodiments.

FIG. 5 illustrates a key management 510 flow diagram with key change events using the system of FIG. 4 under some embodiments. The process 500 generally operates automatically without user involvement (i.e., it can operate without user 302). For the example process of FIG. 5, a user authenticated and obtained a token to work with multiple tenants 508 (denoted Tenants 1 to N). The user 502 through user agent 504 starts working with the different tenants. First, the user agent 504 sends a request, then a particular tenant (e.g., Tenant 2 for the example of FIG. 5) processes the request and returns the result, which is then returned to the user 502. The request for tenant service could be executed sequentially or in parallel, depending on the particular use case.

For the example shown, at a particular time, the Tenant 2 key has changed. The AAS 506 is centrally place to coordinate the change. The key change event includes notification of the AA service 506, the user Agent 504 and the corresponding tenant 508, among any other relevant entity. The user agent 504 automatically, and without user involvement, renews the token and continues serving the requests making this change transparent to the user 502.

For the above-described system and method, the AA key manager handles key management state changes and asynchronously coordinates key state changes with affected user agents that represent end users. The user agent is responsible for authentication and authorization token management coordination with the AAS. This approach provides the following benefits: the end user is not required to re-enter credentials, cross tenant operations may continue without interruptions, and the AA service is provided as one centralized place to abstract interaction with tenant's key management system.

Figure 6:
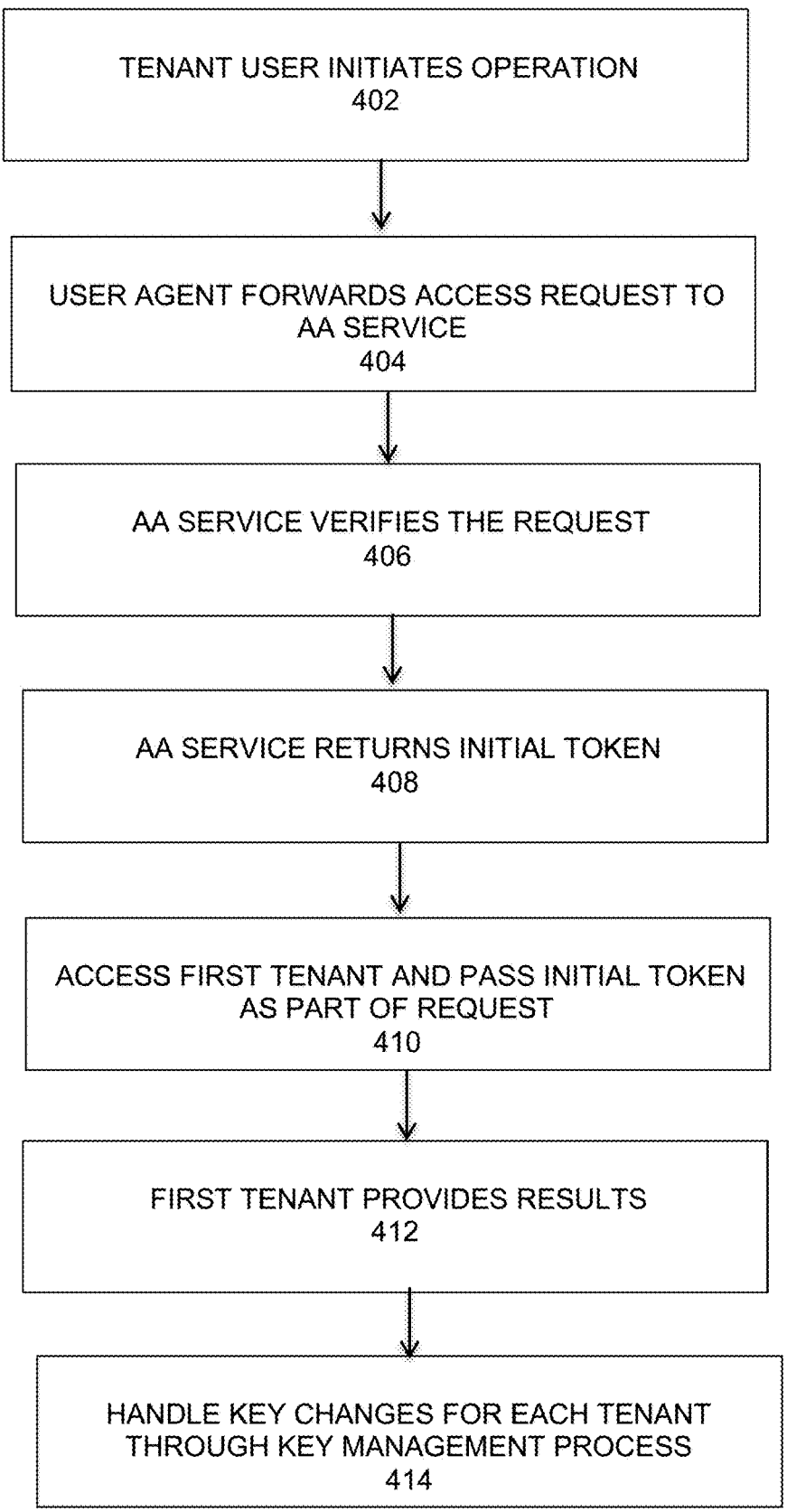
FIG. 6 is a flowchart that illustrates a method of token usage in a multi-tenant environment with life key management under some embodiments.

FIG. 6 is a flowchart that illustrates a method of token usage in a multi-tenant environment with life key management under some embodiments. As shown in FIG. 6, the process starts with step 402 in which a tenant user initiates an operation with a "Begin Operation" event. The user could represent a person, or another software or hardware component. The user agent then forwards the access request to the AA service, step 404. In step 406, the AA service verifies the request if it clears validation. Upon successful verification, the AA service returns a token (i.e., an "initial token"), step 408. This token contains data which is encrypted by different keys and will be consumed by different tenants.

Then a first tenant is accessed with a "Resource/Service Request", step 410, and the initial token is passed as a part of the request. The first tenant provides results with event "Return Results" which passed to the user through a "Present Results" message. It should be noted that implementation of such message passing is dependent upon implementation of the user agent, and various solutions are possible. Certain variations or other functions may be provided in the process, such as continuously presenting a current state to the user, presenting results only at the end of a session, and so on.

In the event of a key change, this is processed by the AA service and notifications are sent asynchronously to the user agent in a key management process, such as illustrated in FIG. 5. For example, if another tenant, e.g., Tenant 2 has a key change, such as through a "Tenant 2 Key change event," the key change event is handled by AA Service and it notifies the user agent that Tenant 2 key has changed. This notification is sent asynchronously to the other events occurring in the system. The user agent handles the event and it issues a "Token renew request" to the AA Service. The initial token is passed as a part of the request. Upon successful verification, the AA Service "Returns refreshed token." The refreshed token will then be used for the rest of the operations. In the case that another key change event occurs, it will be handled in the similar manner described above. It should be noted that another key state change could occur, or the change could occur at any other time, i.e., asynchronously to other events described in this diagram, or the change could occur for another tenant. The efficient token management is achieved by processing key change events asynchronously to other events, providing automatic token renewal without user interaction, ensuring that cross tenant operations continue without interruptions.

Figure 7:
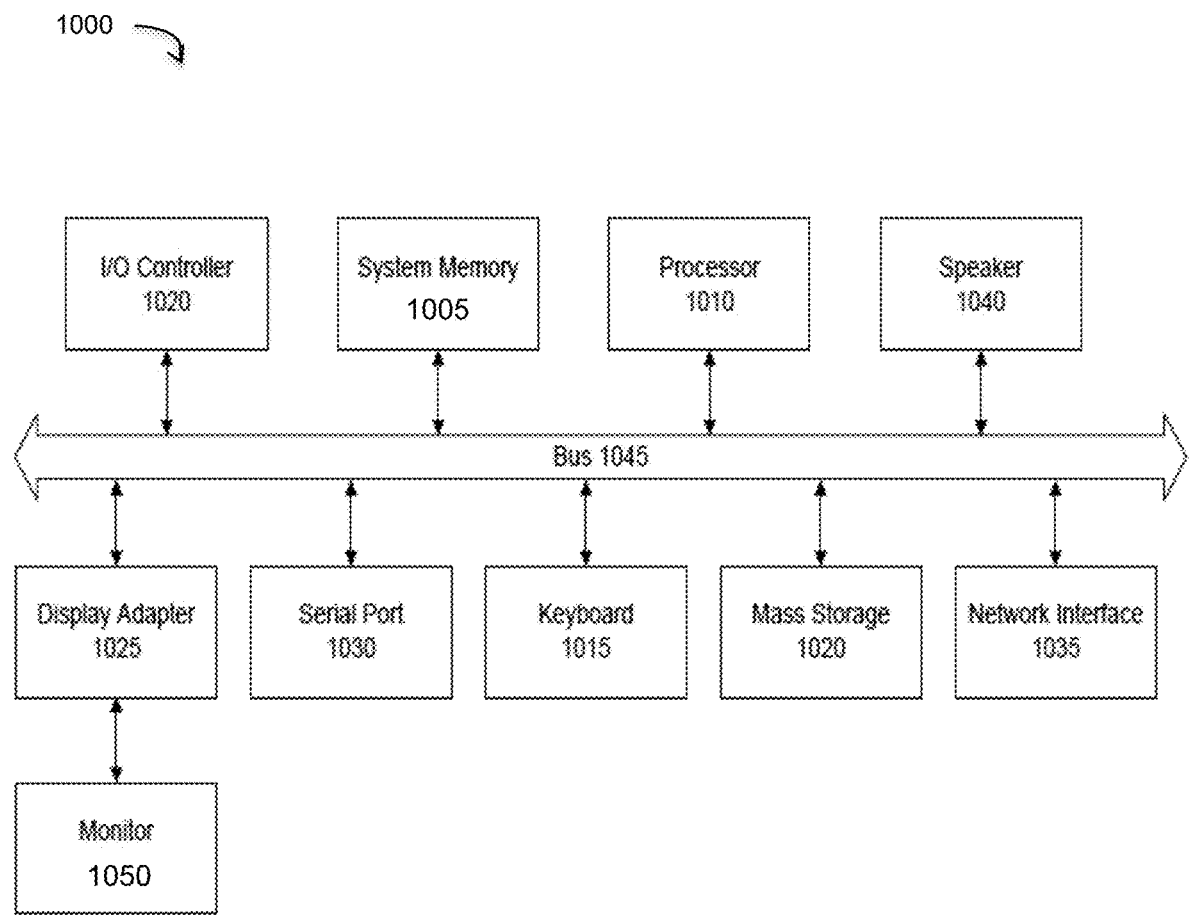
FIG. 7 shows a system block diagram of a computer system used to execute one or more software components of the system of FIG. 1 under some embodiments.

The network environment of FIG. 1 may comprise any number of individual client-server networks coupled over the Internet or similar large-scale network or portion thereof. Each node in the network(s) comprises a computing device capable of executing software code to perform the processing steps described herein. FIG. 7 shows a system block diagram of a computer system used to execute one or more software components of the present system described herein. The computer system 1005 includes a monitor 1050, keyboard 1015, and mass storage devices 1020. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 7 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct internet upgrade patching mechanism or through an applications store (e.g., Apple iTunes and App store, Google Play store, and Windows Phone App store).

The system can run in platform-independent, non-native applications. For example, client can access the system through a web application from one or more servers using a network connection with the server or servers and load the web application in a web browser. For example, a web application can be downloaded from an application server over the Internet by a web browser. Non-native applications can also be obtained from other sources, such as a disk.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for managing token keys in an authentication and authorization process for a multi-tenant computer network, comprising:
   receiving a user request from a user through a user agent for data access to a target tenant computer in the multi-tenant computer network;
   managing a key of a token as part of an automated authentication and authorization (AA) service that handles key state changes through a defined life cycle having stages of storage, escrow, expiration, revocation, suspension, recovery, renewal, and destruction, and asynchronously coordinates the key state changes with the user agent, and wherein the user agent automatically performs the expiration, revocation, suspension, recovery and renewal state changes to renew the token and serves the user request without requiring user involvement in the event of any change of the target tenant computer including a change from a first tenant to a second tenant;
   generating the key to encrypt and sign a data string to encapsulate the token;
   passing the token as part of the user request to network clients to receive a response from a client to the user request;
   notifying, in an event of a key state change, user agents of the key state change asynchronously to other events; and
   generating a refreshed key for subsequent user requests to encapsulate subsequent tokens including renewed tokens for the user.

2. The method of claim 1 wherein the token comprises a Security Assertions Markup Language (SAML) token that is an XML representation of certain claims asserted by the user.

3. The method of claim 2 wherein the SAML token carries statements that are sets of claims made by one entity about another entity in the multi-tenant computer network.

4. The method of claim 1 wherein the other events comprise other requests from the other users in the multi-tenant computer network.

5. The method of claim 4 wherein a respective user agent is associated with each other user.

6. The method of claim 5 wherein the respective user agent is one of a person, a hardware component issuing requests, or a software process issuing requests.

7. The method of claim 6 wherein the multi-tenant computer network comprises a cloud computing network, and wherein each of the user and the other users comprises a user tenant in the multi-tenant computer network.

8. The method of claim 7 wherein the multi-tenant computer network comprises a database management system, and the user request comprises a query to data stored by one or more data sources in the system.

9. The method of claim 8 wherein the authentication and authorization process is part of a role-based access control system for users in the multi-tenant computer network.

10. A system managing token keys in an authentication and authorization process for a multi-tenant computer network, comprising:
    a user agent associated with a user tenant of the multi-tenant computer network and transmitting a user request through the multi-tenant computer network for data access to a target tenant computer in the multi-tenant computer network;
    an automated authentication and authorization (AA) service managing a key of a token to handle key state changes and asynchronously coordinate the key state changes through a defined life cycle having stages of storage, escrow, expiration, revocation, suspension, recovery, renewal, and destruction, with the user agent, and wherein the user agent automatically performs the expiration, revocation, suspension, recovery and renewal state changes to renew the token and serves the user request without requiring user involvement in the event of any change of the target tenant computer including a change from a first tenant to a second tenant;
    a key manager component of the authentication and authorization process encrypting and signing data strings with the key to generate an initial token to transmit the user request to other tenants of the multi-tenant computer network; and
    a hardware component receiving a key management state change and transmitting the state change to other users and events in the system, wherein the key manager issues a refresh token for the user after the state change.

11. The system of claim 10 wherein the token comprises a Security Assertions Markup Language (SAML) token that is an XML representation of certain claims asserted by the user.

12. The system of claim 10 wherein the key state change comprises a change from at least one life cycle stage to another life cycle stage.

13. The system of claim 12 wherein the other events comprise other requests from other users in the system and wherein a respective user agent is associated with each other user, the respective user agent comprising one of a person, a hardware component issuing requests, or a software process issuing requests.

14. The system of claim 13 wherein the system further comprises a database management system, and the user request comprises a query to data stored by one or more data sources in the system.

15. The system of claim 14 wherein the authentication and authorization process is part of a role-based access control system for users in the multi-tenant computer network.

16. A computer program product, comprising a non-transitory computer-readable medium having a computer-readable program code embodied therein, the computer-readable program code adapted to be executed by one or more processors to manage token keys in an authentication and authorization process for a multi-tenant computer network by executing instructions implementing a method comprising:

receiving a user request from a user through a user agent for data access to a target tenant computer in the multi-tenant computer network;

managing a key of a token as part of an automated authentication and authorization (AA) service that handles key state changes through a defined life cycle having stages of storage, escrow, expiration, revocation, suspension, recovery, renewal, and destruction, and asynchronously coordinates the key state changes with the user agent, and wherein the user agent automatically performs the expiration, revocation, suspension, recovery and renewal state changes to renew the token and serves the user request without requiring user involvement in the event of any change of the target tenant computer including a change from a first tenant to a second tenant;

generating the key to encrypt and sign a data string to encapsulate the token;

passing the token as part of the request to the network clients to receive a response from a client to the user request;

notifying, in the event of a key state change, user agents of the key state change asynchronously to other events; and generating a refreshed key for subsequent user requests to encapsulate subsequent tokens including renewed tokens for the user.

\* \* \* \* \*